(12) United States Patent
Kosaka et al.

(10) Patent No.: US 10,476,409 B2
(45) Date of Patent: Nov. 12, 2019

(54) SYNCHRONIZATION CONTROL SYSTEM AND CONTROL DEVICE (71) Applicant: Mitsubishi Electric Corporation, Tokyo (JP)

(72) Inventors: Ko Kosaka, Tokyo (JP); Bampei Kaji, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/318,136

(22) PCT Filed: Apr. 12, 2017

(86) PCT No.: PCT/JP2017/014995
§ 371 (c)(1),
(2) Date: Jan. 16, 2019

(87) PCT Pub. No.: WO2018/189832
PCT Pub. Date: Oct. 18, 2018

(65) Prior Publication Data
US 2019/0238071 A1 Aug. 1, 2019

(51) Int. Cl.
H02P 5/56 (2016.01)
G05D 3/12 (2006.01)

(52) U.S. Cl.
CPC ............. H02P 5/56 (2016.02); G05D 3/12 (2013.01)

(58) Field of Classification Search
CPC .......... H05B 41/3925; G05D 3/12; H02P 5/56
See application file for complete search history.

(56) References Cited

U.S. PATENT DOCUMENTS 5,414,339 A * 5/1995 Masaki ................. B60L 3/003
318/800
9,564,862 B2 * 2/2017 Hoyerby ................ H03F 3/217
(Continued)

FOREIGN PATENT DOCUMENTS

| JP | 2010-022145 A | 1/2010 |
| WO | 2004/092859 A1 | 10/2004 |
| WO | 2014/141515 A1 | 9/2014 |

OTHER PUBLICATIONS

International Search Report dated Jul. 4, 2017 for PCT/JP2017/014995 filed on Apr. 12, 2017, 10 pages including English translation.

(Continued)

Primary Examiner — Thai T Dinh
(74) Attorney, Agent, or Firm — Xsensus LLP (57) ABSTRACT A synchronization control system includes: a first slave station; a second slave station; and a master station, wherein the master station includes: a first command data generating unit that generates the first command data; a feedback data filter that extracts and outputs a frequency component in a first frequency domain from feedback data; a command data filter that extracts and outputs a frequency component in a second frequency domain higher than the first frequency domain from the first command data; an adding unit that adds data output from the feedback data filter and data output from the command data filter, and outputs addition data that is a result of the addition; and a second command data generating unit that generates the second command data on the basis of the addition data.

3 Claims, 7 Drawing Sheets (56) References Cited

U.S. PATENT DOCUMENTS

| | | | |
|---|---|---|---|
| 10,354,683 B2* | 7/2019 | Namie | G11B 5/59627 |
| 2006/0186845 A1* | 8/2006 | Terada | G05B 19/19 |
| | | | 318/432 |
| 2012/0020136 A1* | 1/2012 | Akaishi | H02M 7/48 |
| | | | 363/131 |
| 2015/0355607 A1 | 12/2015 | Nagaoka | |

OTHER PUBLICATIONS

Notification of reasons for refusal received for Japanese Patent Application No. 2018-506456 dated Mar. 20, 2018, 4 pages including English Translation.

Decision to Grant a Patent received for Japanese Patent Application No. 2018-506456 dated Aug. 21, 2018, 4 pages including English Translation.

* cited by examiner

SYNCHRONIZATION CONTROL SYSTEM AND CONTROL DEVICE

CROSS-REFERENCE TO RELATED APPLICATIONS

The present application is based on PCT filing PCT/JP2017/014995, filed 12 Apr. 2017, the entire contents of which being incorporated herein by reference.

FIELD

The present invention relates to a synchronization control system and a control device that control driving of a plurality of mechanical devices.

BACKGROUND

In industrial machines such as packaging machines and rotary cutters, such synchronization control as causing the operation of a cutting device controlled by driving of a servomotor to follow the operation of a conveyor device controlled by another servomotor has been performed. An example of a control system for carrying out the synchronization control is a synchronization control system constituted by a master station, two slave stations, and a sensor connected via a network enabling transmission/reception of data.

In the synchronization control system, the master station is a control device having a function A that is a function of generating command data and transmitting the command data to the first slave station. The first slave station has a function a1 that is a function of controlling driver including servomotors on the basis of the command data received from the master station. The sensor has a function b that is a function of transmitting feedback data to the master station. The feedback data is data indicating the state of the conveyor device driven by the driver, for example. The master station further has a function B that is a function of generating command data on the basis of the feedback data received from the sensor and transmitting the command data to the second slave station. The second slave station has a function a2 that is a function of controlling driver on the basis of the command data received from the master station.

In the synchronization control system described above, ripple due to an electrical or mechanical factor may be caused in the feedback data transmitted by the sensor to the master station by using the function b. The ripple caused in the feedback data has an adverse effect on the function B of the master station. Thus, the accuracy of the command data transmitted by the function B is degraded.

As a technology for reducing the influence of ripple on a detected machine end position in a control system using a servomotor, Patent Literature 1, for example, teaches a technology using data obtained by combining a high frequency component of a motor end position and a low frequency component of a machine end position as feedback data.

CITATION LIST

Patent Literature

Patent Literature 1: International Publication No. WO 2014/141515

SUMMARY

Technical Problem

In a case where the technology taught by Patent Literature 1 is applied to a synchronization control system, the ripple is removed since the high frequency component is removed from the machine end position by the low pass filter. In the technology described in Patent Literature 1, however, the high frequency component of the motor end position needs to be used, which renders detection of the motor end position essential. Thus, with the technology of Patent Literature 1, sensors need to be provided at two positions. There are, however, synchronization control systems that do not include sensors provided at two positions. Furthermore, even if it is attempted to add a sensor to a synchronization control system that does not include sensors provided at two positions, there are cases where the sensor cannot be added owing to some constraints.

In addition, in a case where sensors are not provided at two positions and feedback data is simply filtered by a low pass filter, a delay time may occur to the feedback data resulting from the filtering. There is thus a problem of lower responsiveness in synchronization control when the feedback data resulting from the filtering is used.

The present invention has been made in view of the above, and an object thereof is to provide a synchronization control system and a control device capable of reducing the influence of ripple on feedback data while preventing degradation in the responsiveness even with one sensor for detecting feedback data.

Solution to Problem

To solve the aforementioned problems and achieve the object, a synchronization control system according to the present invention includes a first slave station that controls a first device, a second slave station that controls a second device, and a master station that transmits first command data for causing the first device to operate to the first slave station, and transmits second command data for causing the second device to operate to the second slave station. The master station further includes a first command data generating unit that generates the first command data, a first filter that extracts and outputs a frequency component in a first frequency domain from the feedback data, which is a result of detection of an operation state of the first device, and a second filter that extracts and outputs a frequency component in a second frequency domain, which is a domain of frequencies higher than the first frequency domain, from the first command data. The master station further includes an adding unit that adds data output from the first filter and data output from the second filter, and outputs addition data, which is a result of the addition, and a second command data generating unit that generates the second command data on the basis of the addition data.

Advantageous Effects of Invention

The control device according to the present invention produces an effect of reducing the influence of ripple on feedback data while preventing degradation in the responsiveness even with one sensor for detecting feedback data.

DESCRIPTION OF EMBODIMENTS

A synchronization control system and a control device according to an embodiment of the present invention will be described in detail below with reference to the drawings. Note that the present invention is not limited to the embodiment.

Embodiment

Figure 1:
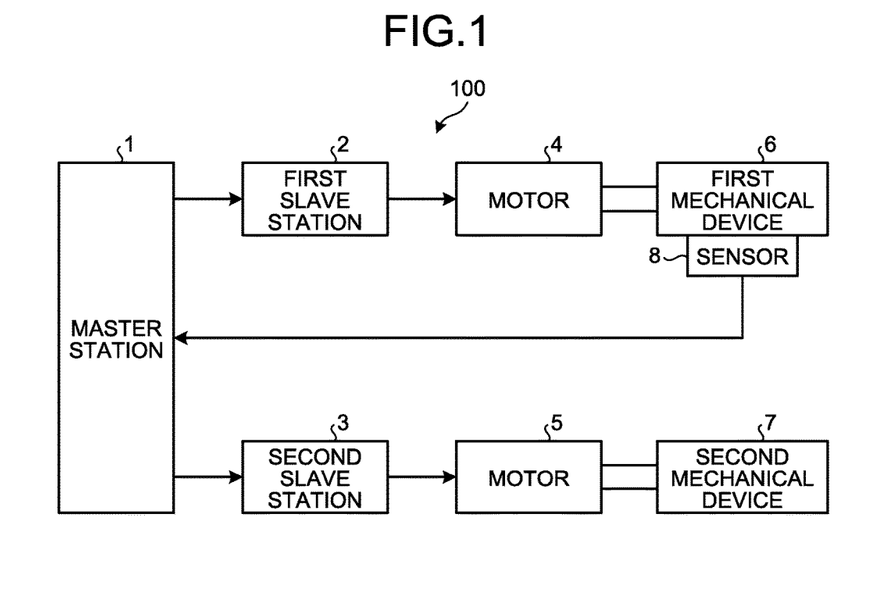
FIG. 1 is a diagram illustrating an example configuration of a synchronization control system according to an embodiment.

FIG. 1 is a diagram illustrating an example configuration of a synchronization control system according to an embodiment of the present invention. As illustrated in FIG. 1, a synchronization control system 100 according to the embodiment of the present invention includes a master station 1, a first slave station 2, a second slave station 3, and a sensor 8. The master station 1 is connected with the first slave station 2, the second slave station 3 and the sensor 8 via a network.

Devices controlled by the synchronization control system 100 are motors 4 and 5, a first mechanical device 6, and a second mechanical device 7, and the synchronization control system 100 controls the motors 4 and 5 so that the first mechanical device 6 and the second mechanical device 7 perform desired operations.

The first slave station 2 generates a torque command for the motor 4 on the basis of command data transmitted from the master station 1, and outputs the torque command to the motor 4. The motor 4 is driven by the torque command. The first mechanical device 6 is driven by rotation torque of the motor 4. In other words, the first slave station 2 controls a first device constituted by the motor 4 and the first mechanical device 6 driven by the motor 4. The sensor 8 that detects the operation of the first mechanical device 6 is mounted on the first mechanical device 6. The sensor 8 detects the operation state of the first mechanical device 6, and transmits the detection result as feedback data to the master station 1.

The second slave station 3 generates a torque command for the motor 5 on the basis of command data transmitted from the master station 1, and outputs the torque command to the motor 5. The motor 5 is driven by the torque command. The second mechanical device 7 is driven by the rotation torque of the motor 5. In other words, the second slave station 3 controls a second device constituted by the motor 5 and the second mechanical device 7 driven by the motor 5.

The master station 1, which is an example of the control device according to the present invention, generates first command data, which is data for driving the motor 4 to cause the first mechanical device 6, which is a first device to be controlled, to operate and transmits the first command data to the first slave station 2. The master station 1 uses feedback data received from the sensor 8 to generates second command data for driving the motor 5 to cause the second mechanical device 7, which is a second device to be controlled, to operate, and transmits the second command data to the second slave station 3. Thus, the master station 1 transmits the first command data for causing the first device to operate to the first slave station 2, and transmits the second command data for causing the second device to operate to the second slave station 3.

Figure 2:
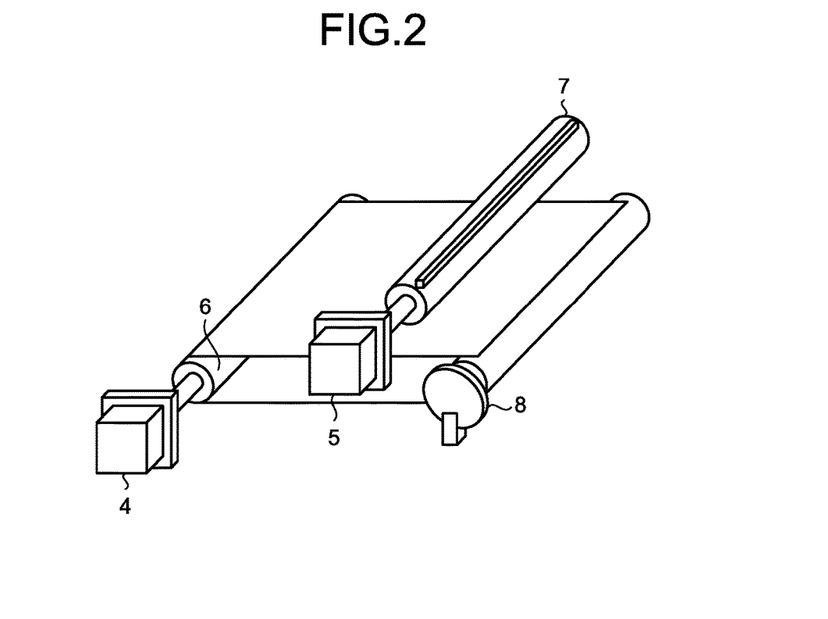
FIG. 2 is a drawing illustrating an example of a machine system to which the synchronization control system of the embodiment is applied.

FIG. 2 is a drawing illustrating an example of a machine system to which the synchronization control system of the present embodiment is applied. The machine system illustrated in FIG. 2 is a packaging machine or a rotary cutter, for example. In the example illustrated in FIG. 2, the first mechanical device 6 is a conveyor device, the second mechanical device 7 is a cutting device, and the sensor 8 is a tachometer. Examples of the motors 4 and 5 include rotary servomotors. The motors 4 and 5 are not limited to this example, but may be any motors capable of driving the first mechanical device 6 and the second mechanical device 7, respectively.

The motor 5 that drives the second mechanical device 7, which is a cutting device, operates following the operation of the first mechanical device 6, and sheet conveyed by the first mechanical device 6, which is a conveyor device, is thus cut by the second mechanical device 7, which is the cutting device, to a desired sheet length. In this manner, the operation of the second mechanical device 7 is subjected to synchronization control to follow the operation of the first mechanical device 6. Note that the configuration illustrated in FIG. 2 is an example, and systems to which the synchronization control system is applied may be any machine systems in which the operation of the first mechanical device 6 is controlled to follow the operation of the second mechanical device 7, and are not limited to the example illustrated in FIG. 2.

Figure 3:
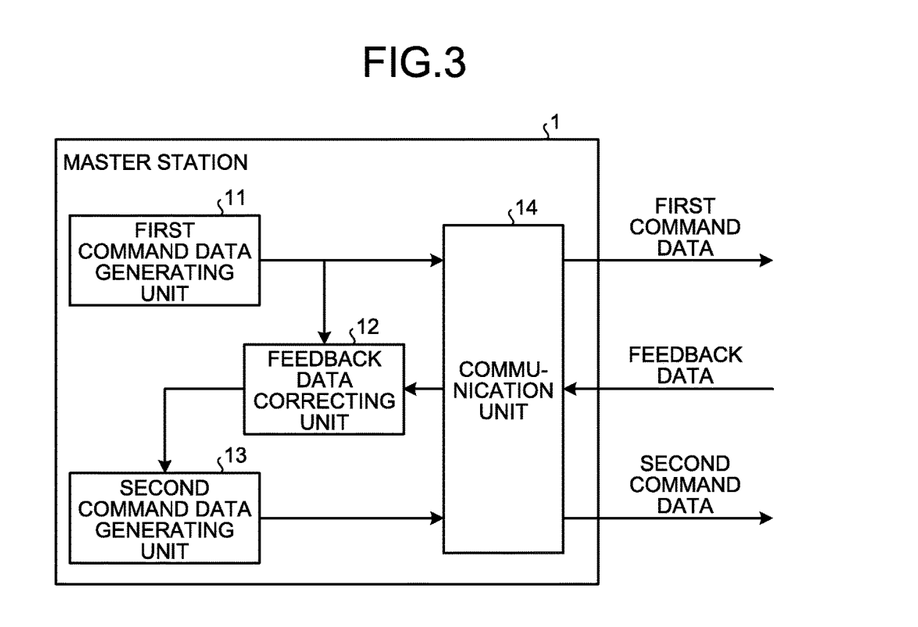
FIG. 3 is a diagram illustrating an example configuration of a master station of the embodiment.

FIG. 3 is a diagram illustrating an example configuration of the master station 1 of the present embodiment. As illustrated in FIG. 3, the master station 1 includes a first command data generating unit 11, a feedback data correcting unit 12, a second command data generating unit 13, and a communication unit 14.

The first command data generating unit 11 generates first command data to be transmitted to the first slave station 2, and outputs the first command data to the feedback data correcting unit 12 and the communication unit 14. The first command data is generated so that the first mechanical device 6 operates in a desired operation pattern. In a case where the first mechanical device 6 is the conveyor device illustrated in FIG. 2, the first command data is generated so that the first mechanical device 6 feeds sheet at constant speed. Examples of the first command data include speed command data, which is rotational speed command data for controlling the rotational speed of the motor 4. The feedback data correcting unit 12 generates corrected feedback data on the basis of the first command data generated by the first command data generating unit 11 and the feedback data received from the sensor 8 via the communication unit 14, and outputs the corrected feedback data to the second command data generating unit 13.

The second command data generating unit 13 generates second command data for causing the second mechanical device 7 to operate on the basis of the corrected feedback data, and outputs the second command data to the communication unit 14. Examples of the second command data include position command data for controlling the rotational position of the motor 5. Examples of the second command data generating unit 13 include an electronic cam device that retrieves a signal, that is, an input value, generates a new signal, that is, an output value on the basis of a preset cam profile and the input value, and outputs the output value. The electronic cam device is a device having an electronic cam function, which is a function of controlling a driven shaft motor in synchronization with a main shaft position instead of using a mechanical cam that rotates about a main shaft. In this example, in the present embodiment, the motor 4 is a motor corresponding to the main shaft and the motor 5 is a motor corresponding to the driven shaft. The cam profile includes values such as the driven shaft position and speed defined depending on the main shaft position. For example, the second command data generating unit 13 obtains position data, that is, the main shaft position by integrating the corrected feedback data input to the second command data generating unit 13, and generates position command data indicating the position of the motor 5 of the driven shaft on the basis of the main shaft position and the cam profile.

The communication unit 14 receives feedback data, which is a result of detection by the sensor 8, from the sensor 8, and outputs the feedback data to the feedback data correcting unit 12. The communication unit 14 transmits the first command data received from the first command data generating unit 11 to the first slave station 2, and transmits the second command data received from the second command data generating unit 13 to the second slave station 3.

Figure 4:
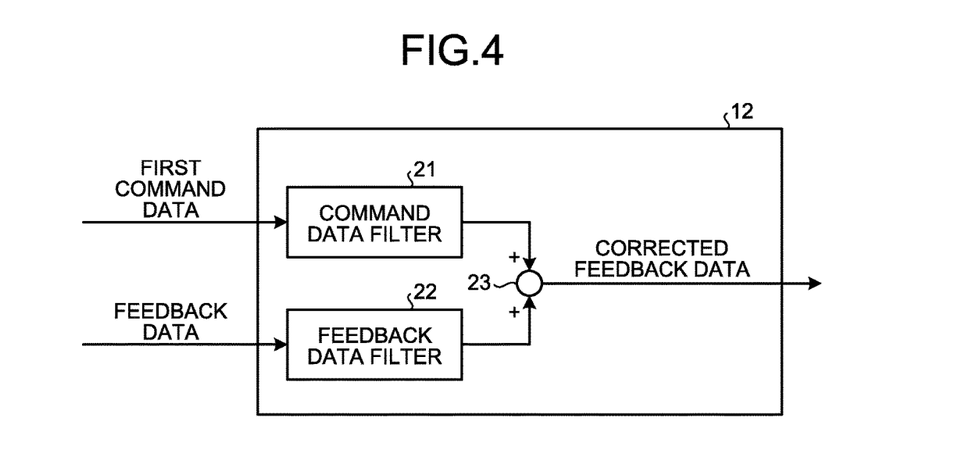
FIG. 4 is a diagram illustrating an example internal configuration of a feedback data correcting unit of the embodiment.

FIG. 4 is a diagram illustrating an example internal configuration of the feedback data correcting unit 12 of the present embodiment. As illustrated in FIG. 4, the feedback data correcting unit 12 includes a command data filter 21, a feedback data filter 22, and an adding unit 23. The feedback data filter 22 is a first filter that extracts and outputs a frequency component in a first frequency domain from the feedback data. The command data filter 21 is a second filter that extracts and outputs a frequency component in a second frequency domain, which is a domain of frequencies higher than the first frequency domain, from the first command data.

The first command data output from the first command data generating unit 11 is input to the command data filter 21, and the feedback data output from the communication unit 14 is input to the feedback data filter 22.

The feedback data filter 22 is a filter that transmits and outputs the frequency component in the predetermined first frequency domain of the feedback data. An example of the frequency component in the first frequency domain is a low frequency component that is a frequency component equal to or lower than a predetermined frequency. Specifically, the feedback data filter 22 is a first-order lag low pass filter, for example. In a case where the feedback data filter 22 is a first-order lag low pass filter, a transfer function Gfb(s) of the feedback data filter 22 is expressed by the following formula (1) where a time constant of the feedback data filter 22 is represented by Tfb. Note that s represents a complex number.

$$Gfb(s)=1/(1+Tfb*s) \quad (1)$$

In addition, the command data filter 21 is a filter that extracts and outputs a frequency component in the second frequency domain, which is a domain of frequencies higher than the first frequency domain, of the first command data. An example of the frequency component in the second frequency domain is a high frequency component that is a frequency component equal to or higher than a predetermined frequency. Specifically, the command data filter 21 is a first-order high pass filter, for example. In a case where the command data filter 21 is a first-order high pass filter, a transfer function Gcmd(s) of the command data filter 21 is expressed by the following formula (2) where a time constant of the command data filter 21 is represented by Tcmd.

$$Gcmd(s)=Tcmd*s/(1+Tcmd*s) \quad (2)$$

The adding unit 23 adds the feedback data, which is data output from the feedback data filter 22, and the first command data, which is data output from the command data filter 21, and outputs addition data resulting from the addition as the corrected feedback data.

Next, a hardware configuration of the master station 1 of the present embodiment will be described. The communication unit 14 illustrated in FIG. 3 is a communication circuit that is a transmitter and receiver. The first command data generating unit 11, the feedback data correcting unit 12, and the second command data generating unit 13 illustrated in FIG. 3 are implemented by a processing circuit. The processing circuit may be a processing circuit mounted as dedicated hardware, or a control circuit including a processor. The processing circuit mounted as dedicated hardware may be an application specific integrated circuit (ASIC), a field programmable gate array (FPGA), or the like, or combination thereof.

Figure 5:
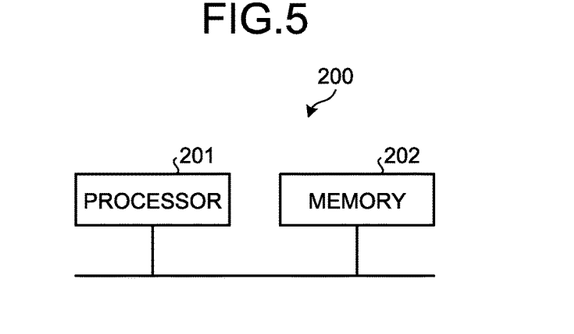
FIG. 5 is a diagram illustrating an example configuration of a control circuit.

In a case where the processing circuit is a control circuit, the control circuit is a control circuit 200 illustrated in FIG. 5, for example. FIG. 5 is a diagram illustrating an example configuration of the control circuit 200. The control circuit 200 includes a processor 201, which is a central processing unit (CPU) or the like, and a memory 202. The processor 201 is a CPU, a microprocessor, or the like. The memory 202 is nonvolatile or volatile semiconductor memory such as a random access memory (RAM), a read only memory (ROM), or a flash memory, or a magnetic disk or the like, for example.

In a case where the first command data generating unit 11, the feedback data correcting unit 12, and the second command data generating unit 13 are implemented by the control circuit 200 illustrated in FIG. 5, the functions of the first command data generating unit 11, the feedback data correcting unit 12, and the second command data generating unit 13 are implemented by the processor 201 executing programs for implementing the functions of the first command data generating unit 11, the feedback data correcting unit 12, and the second command data generating unit 13 stored in the memory 202. The memory 202 is also used as a storage area when programs are executed by the processor 201. Alternatively, the first command data generating unit 11, the feedback data correcting unit 12, and the second command data generating unit 13 may be partially implemented by a processing circuit that is dedicated hardware, and partially implemented by the control circuit 200 described above.

Next, effects of the present embodiment, that is, reasons for which the master station 1 of the present embodiment is capable of performing synchronization control with minimized influence of ripples on feedback data and with high responsiveness will be explained.

Figure 6:
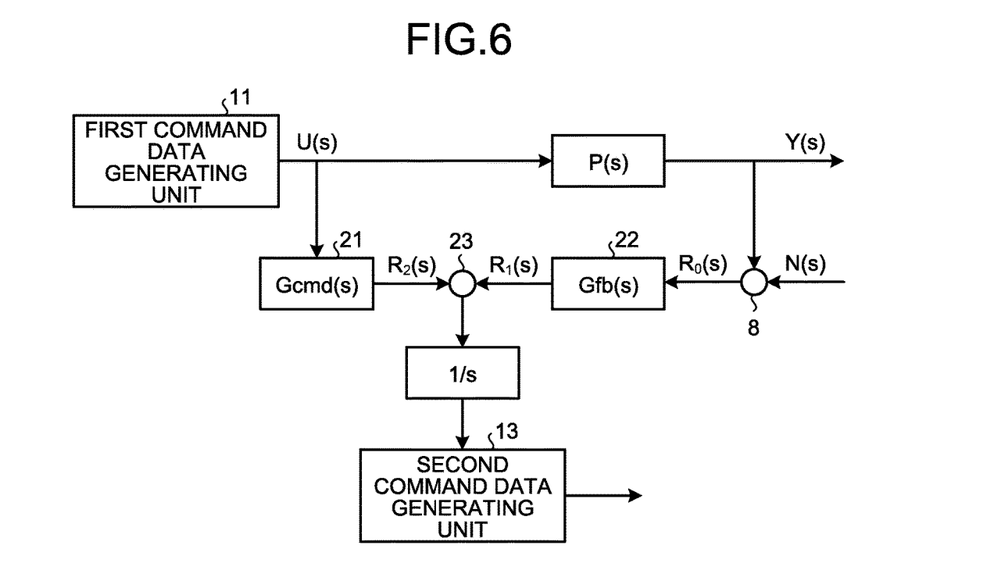
FIG. 6 is a block diagram illustrating signal transfer between the synchronization control system and a device controlled by the synchronization control system.

FIG. 6 is a block diagram illustrating signal transfer between the synchronization control system 100 and a device controlled by the synchronization control system 100. In FIG. 6, the first command data output from the first command data generating unit 11 is represented by $U(s)$, a speed response of the first mechanical device 6 is represented by $Y(s)$, and a transfer function from the first command data to the speed response $Y(s)$ of the first mechanical device 6 is represented by $P(s)$. In addition, in FIG. 6, the feedback data input to the feedback data filter 22 is represented by $R_0(s)$, the feedback data output from the feedback data filter 22 is represented by $R_1(s)$, and the first command data output from the command data filter 21 is represented by $R_2(s)$. In addition, in FIG. 6, noise applied to the sensor 8 is represented by $N(s)$, a transfer function of the command data filter 21 is represented by $Gcmd(s)$, and a transfer function of the feedback data filter 22 is represented by $Gfb(s)$. In this case, the speed response $Y(s)$ of the first mechanical device 6 is expressed by the following formula (3).

$$Y(s)=U(s)P(s) \quad (3)$$

In addition, the feedback data $R_0(s)$ input to the feedback data filter 22 is expressed by the following formula (4). Assume that the sensor 8 detects the speed of the first mechanical device 6.

$$R_0(s)=U(s)P(s)+N(s) \quad (4)$$

Figure 7:
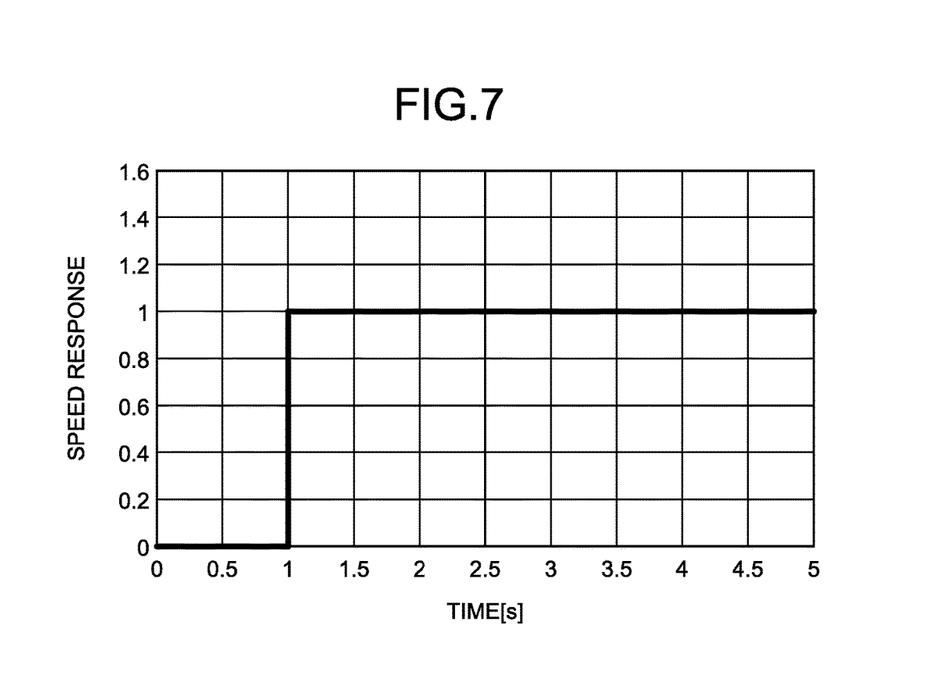
FIG. 7 is a graph illustrating an example of speed response Y(s) of a first mechanical device.

Simulation was conducted to obtain behaviors of respective signals in the present embodiment. Examples of respective signals obtained in the simulation are presented below. First, the first command data $U(s)$ was used as a unit step function, $P(s)=1$ was substituted in the aforementioned formula (3), and the speed response $Y(s)$ of the first mechanical device 6 was obtained by simulation. FIG. 7 is a graph illustrating an example of the speed response $Y(s)$ of the first mechanical device 6.

Figure 8:
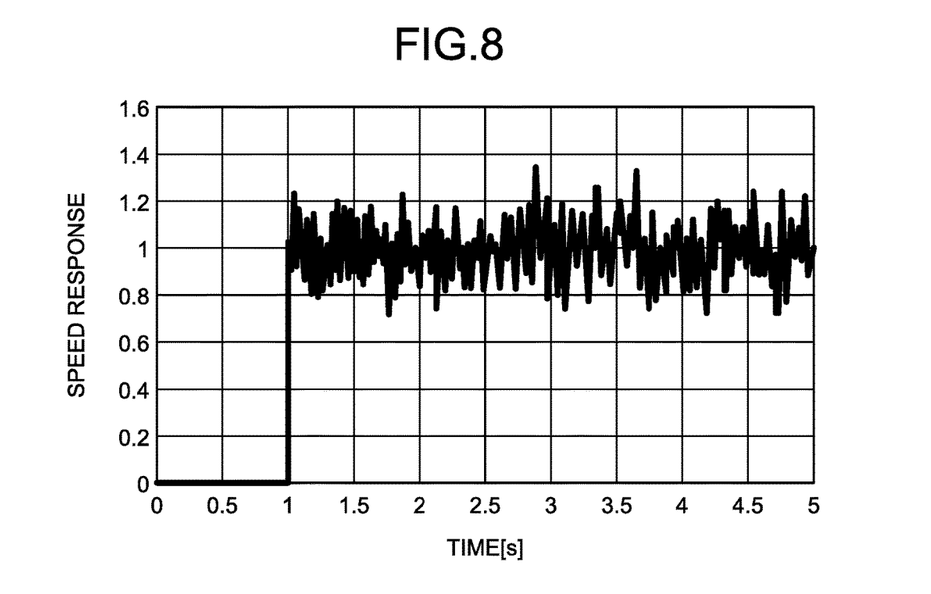
FIG. 8 is a graph illustrating an example of a simulation result of the speed response of the first mechanical device detected by a sensor.

The feedback data $R_0(s)$ transmitted from the sensor 8 to the master station 1 and input to the feedback data filter 22 is a speed response of the first mechanical device 6 detected by the sensor 8. FIG. 8 is a graph illustrating an example of a simulation result of the speed response of the first mechanical device 6 detected by the sensor 8. In the example illustrated in FIG. 8, the noise $N(s)$ was generated by using a Gaussian random number generator with a mean of 0 and a variance of 0.1, and similarly to FIG. 7, the first command data $U(s)$ was used as a unit step function, and $P(s)=1$ was assigned.

While the waveform of the speed response that is supposed to be detected by using the sensor 8 is that illustrated in FIG. 7, a waveform illustrated in FIG. 8, that is, the waveform of the feedback data $R_0(s)$ is input to the master station 1. The feedback data $R_0(s)$ contains noise as illustrated in FIG. 8.

Figure 9:
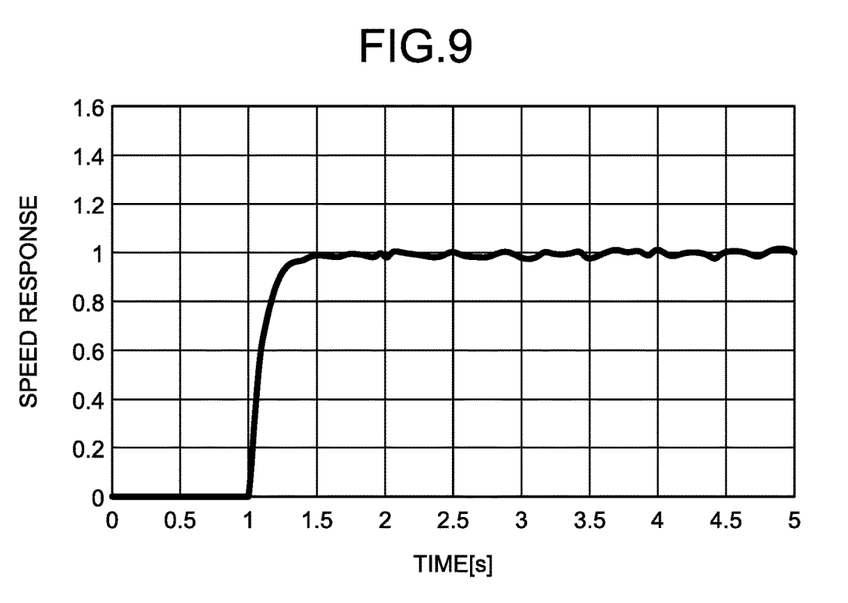
FIG. 9 is a graph illustrating an example of feedback data $R_1(s)$ output from a feedback data filter.

In the present embodiment, the feedback data $R_0(s)$ is input to and filtered by the feedback data filter 22 having the transfer function $Gfb(s)$ expressed by the aforementioned formula (1). FIG. 9 is a graph illustrating an example of the feedback data $R_1(s)$ output from the feedback data filter 22. In the example illustrated in FIG. 9, the feedback data $R_1(s)$ output from the feedback data filter 22 when the feedback data $R_0(s)$ illustrated in FIG. 8 is input to the feedback data filter 22 is illustrated. In addition, in the example illustrated in FIG. 9, a low pass filter having a transfer function obtained by substituting Tfb=0.1 [s] into the aforementioned formula (1) is used as the feedback data filter 22. As can be seen in FIGS. 8 and 9, while a smooth speed response waveform with reduced noise is obtained by using the feedback data filter 22, the feedback data $R_1(s)$ is a first-order lag step response, and phase lag is thus caused.

Figure 10:
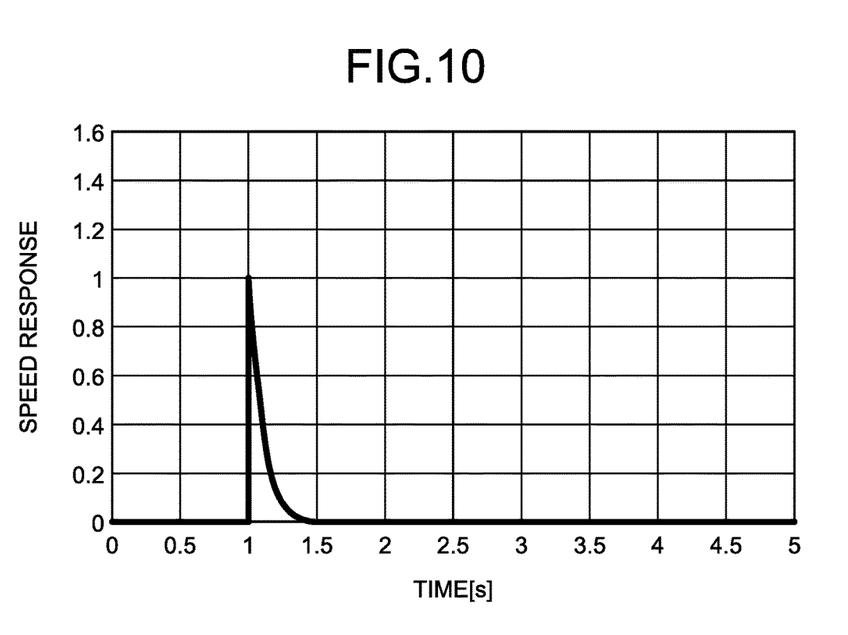
FIG. 10 is a graph illustrating an example of first command data output from a command data filter.

In the present embodiment, the first command data is input to and filtered by the command data filter 21 having the transfer function $Gcmd(s)$ expressed by the aforementioned formula (2). FIG. 10 is a graph illustrating an example of the first command data output from the command data filter 21. In the example of FIG. 10, a high pass filter having a transfer function obtained by substituting Tcmd=0.1 [s] into the aforementioned formula (2) is used as the command data filter 21. Note that the time constant of the feedback data filter 22 and that of the command data filter 21 may be of equal value. When the time constant of the feedback data filter 22 and that of the command data filter 21 are of equal value, the lag caused by the feedback data filter 22, which is a low pass filter, is properly corrected. The lag remains when the time constant of the command data filter 21 is larger than the time constant of the feedback data filter 22, and the lag is excessively corrected when the time constant of the command data filter 21 is smaller than the time constant of the feedback data filter 22. As a result of performing proper correction with the time constant of the feedback data filter 22 and that of the command data filter 21 being of equal value, feedback data with high responsiveness equivalent to that of a supposed ideal speed response $Y(s)$ is obtained as the corrected feedback data.

Figure 11:
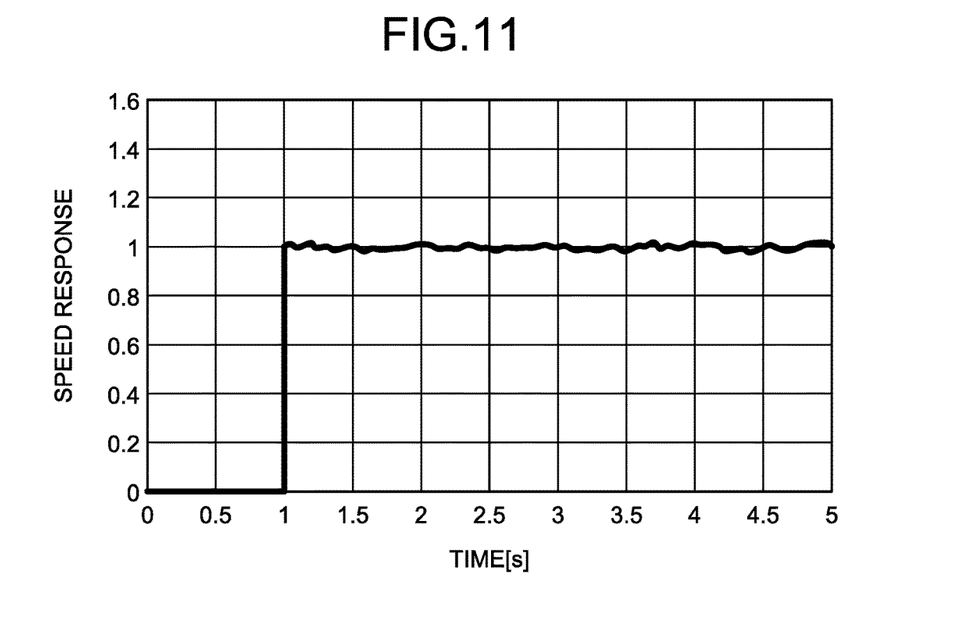
FIG. 11 is a graph illustrating an example of corrected feedback data.

In the present embodiment, the adding unit 23 adds the first command data $R_2(s)$ output from the command data filter 21 and the feedback data $R_1(s)$ output from the feedback data filter 22, and outputs the result of addition as the corrected feedback data to the second command data generating unit 13. FIG. 11 is a graph illustrating an example of the corrected feedback data. FIG. 11 illustrates a result of adding the feedback data $R_1(s)$ illustrated in FIG. 9 and the first command data $R_2(s)$ illustrated in FIG. 10.

As illustrated in FIG. 8, since noise is contained in the feedback data $R_0(s)$, the master station 1 may not generate correct second command data by performing control using the feedback data $R_0(s)$ without any correction. In addition, as illustrated in FIG. 9, the feedback data $R_1(s)$ output from the feedback data filter 22 is reduced in noise but has a phase lag. Thus, when the master station 1 performs control using the feedback data $R_1(s)$, the responsiveness is lowered. In contrast, in the present embodiment, the master station 1 performs control using the corrected feedback data resulting from addition of the first command data $R_2(s)$ and the feedback data $R_1(s)$. As illustrated in FIG. 11, the corrected feedback data is reduced in noise, that is, ripple similarly to the feedback data $R_1(s)$ illustrated in FIG. 9, and the phase lag of the feedback data $R_1(s)$ illustrated in FIG. 9 is corrected. It can thus be seen that feedback data with high responsiveness equivalent to that of a supposed ideal speed response $Y(s)$ is obtained as the corrected feedback data.

Next, the reasons for which the responsiveness in synchronization control is increased by generating the second command data by using the corrected feedback data described above will be explained with reference to examples. Here, the synchronization control system of the present embodiment is assumed to be applied to the machine system illustrated in FIG. 2. In addition, the second command data generating unit 13 is assumed to be an electronic cam device that obtains position data of the first mechanical device 6 by integrating the corrected feedback data, and generates the second command data on the basis of the position data and a preset cam profile. In addition, the second command data is assumed to be the position command data for the motor 5.

Figure 12:
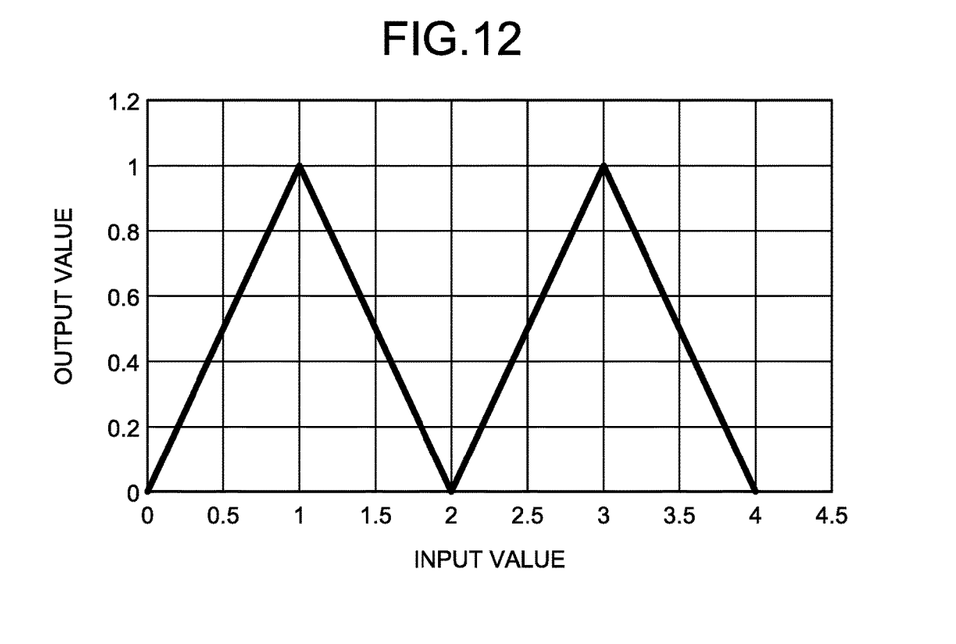
FIG. 12 is a graph illustrating a cam profile used by a second command data generating unit.

FIG. 12 is a graph illustrating an example of the cam profile used by the second command data generating unit 13. In the example illustrated in FIG. 12, the cam profile is a profile in which a decrease in the output value after an increase thereof is repeated as the input value increases. The input value is the corrected feedback data, and the output value is the second command data, that is, the position command data for the motor 5. As illustrated in FIG. 12, the behavior of the decrease in the position of the motor 5 after the increase thereof as the input value increases means that the rotational position of the second mechanical device 7 illustrated in FIG. 2 repeats reciprocation between the maximum value and the minimum value as sheet is fed by the first mechanical device 6. The cutting device, which is the second mechanical device 7, performs cutting operation at a timing when the second command data becomes the maximum value.

Figure 13:
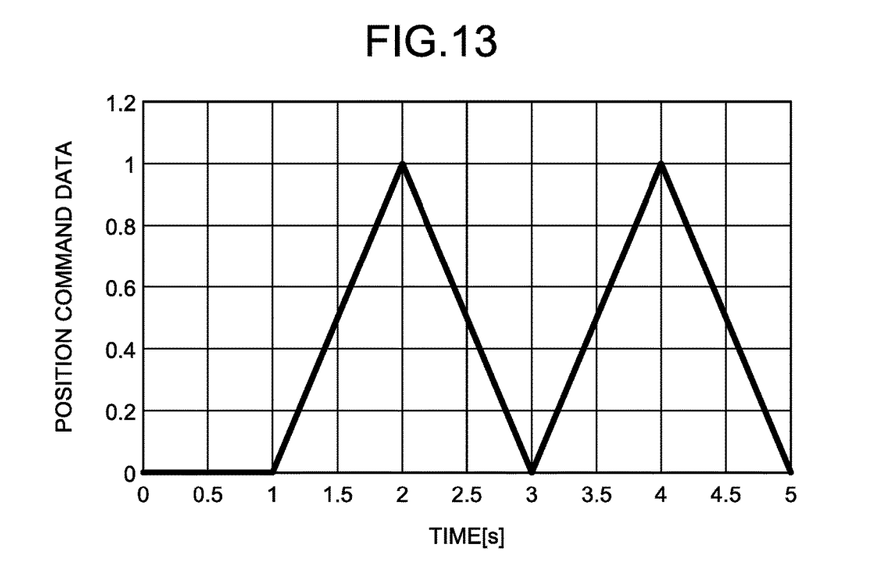
FIG. 13 is a graph illustrating an example of second command data, that is, position command data generated by the second command data generating unit in the embodiment.
Figure 14:
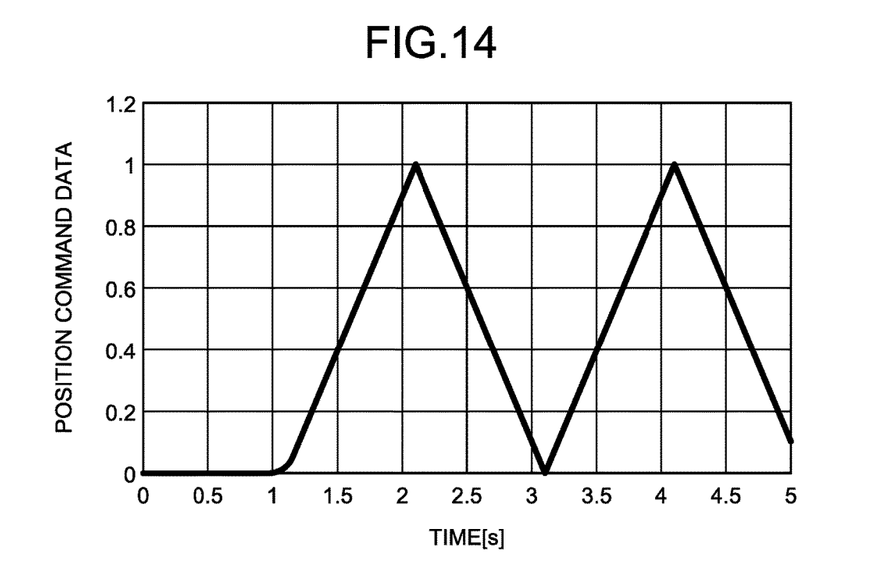
FIG. 14 is a graph illustrating an example of second command data, that is, position command data generated by a second command data generating unit in a comparative example.

FIG. 13 is a graph illustrating an example of the second command data, that is, the position command data generated by the second command data generating unit 13 in the present embodiment. FIG. 14 is a graph illustrating an example of second command data, that is, position command data generated by a second command data generating unit in a comparative example. The comparative example illustrated in FIG. 14 is an example in which feedback data $R_1(s)$ is input instead of the corrected feedback data to the second command data generating unit 13. In both of FIGS. 13 and 14, the second command data generated by the second command data generating unit 13 on the assumption of the cam profile illustrated in FIG. 12 is obtained by simulation. In addition, regarding the first command data, the parameters in the simulation are assumed to be the same as those in the simulation illustrated in FIGS. 7 to 12.

In the example illustrated in FIG. 13, since the corrected feedback data is input to the second command data generating unit 13, the time from the start of the simulation until the second command data reaches the maximum value is shorter in the example illustrated in FIG. 13 that in the example illustrated in FIG. 14, which is the comparative example. Thus, the rise of the second command data is more rapid than the rise in the example illustrated in FIG. 14, which is the comparative example, and the responsiveness in synchronization control, that is, the responsiveness to the operation of the second mechanical device 7 is increased.

On the basis of the above, according to the present embodiment, the result of addition of the high frequency component extracted from the first command data by the command data filter 21 and the low frequency component extracted from the feedback data by the feedback data filter 22 is used as the corrected feedback data for control, that is, generation of the second command data. This enables data that is improved in the influence of ripple on the feedback data from the sensor 8 and in the responsiveness, which is equivalent to an ideal speed response $Y(s)$ to be obtained.

While the first command data is a unit step function in the examples described above, the waveform of the first command data is not limited thereto, but other waveforms including a ramp function, for example, produce effects similar to those in the above-described examples. In addition, while the transfer function $P(s)$ of the first mechanical device 6 is expressed by a model where $P(s)=1$ in the examples described above, the transfer function is not limited thereto, and the first mechanical device 6 expressed by other models produces similar effects.

The configurations presented in the embodiment above are examples of the present invention, and can be combined with other known technologies or can be partly omitted or modified without departing from the scope of the present invention.

REFERENCE SIGNS LIST

1 master station; 2 first slave station; 3 second slave station; 4, 5 motor; 6 first mechanical device; 7 second mechanical device; 8 sensor; 11 first command data generating unit; 12 feedback data correcting unit; 13 second command data generating unit; 14 communication unit; 21 command data filter; 22 feedback data filter; 23 adding unit; 100 synchronization control system.

The invention claimed is:

1. A synchronization control system comprising:
a first sub-controller to control a first driver;
a second sub-controller to control a second driver; and
a master controller to transmit first command data for causing the first driver to operate to the first sub-controller, and transmit second command data for causing the second driver to operate to the second sub-controller, wherein
the master controller includes:
   first command data generating circuitry to generate the first command data;
   a first filter to extract and output a frequency component in a first frequency domain from feedback data, the feedback data being a result of detection of an operation state of the first driver;
   a second filter to extract and output a frequency component in a second frequency domain from the first command data, the second frequency domain being a domain of frequencies higher than the first frequency domain;
   circuitry configured to add data output from the first filter and data output from the second filter, and output addition data, the addition data being a result of the addition; and
   second command data generating circuitry to generate the second command data on the basis of the addition data, and wherein the first filter is a low pass filter, the second filter is a high pass filter, and a time constant of the first filter and a time constant of the second filter are equal to each other.

2. The synchronization control system according to claim 1, wherein
the first driver includes a first motor and a first mechanical device driven by the first motor,
the second driver includes a second motor and a second mechanical device driven by the second motor, and
the feedback data is a result of detection of an operation state of the first mechanical device.

3. A controller comprising:
first command data generating circuitry to generate first command data to be transmitted to a first sub-controller that controls a first driver, the first command data being command data causing the first driver to operate;
a first filter to extract and output a frequency component in a first frequency domain from feedback data, the feedback data being a result of detection of an operation state of the first driver;
a second filter to extract and output a frequency component in a second frequency domain from the first command data, the second frequency domain being a domain of frequencies higher than the first frequency domain;
circuitry configured to add data output from the first filter and data output from the second filter, and output addition data, the addition data being a result of the addition; and
second command data generating circuitry to generate second command data to be transmitted to a second sub-controller on the basis of the addition data, the second command data being command data causing a second driver controlled by the second sub-controller to operate,
wherein the first filter is a low pass filter, the second filter is a high pass filter, and a time constant of the first filter and a time constant of the second filter are equal to each other.

* * * * *